United States Patent [19]

Woodson et al.

[11] Patent Number: 4,808,235

[45] Date of Patent: Feb. 28, 1989

[54] CLEANING GAS TURBINE COMPRESSORS

[75] Inventors: Jeffrey B. Woodson; Lance A. Cooper; Helen M. White, all of Lake Jackson; Gordon C. Fischer, Angleton, all of Tex.

[73] Assignee: The Dow Chemical Company, Midland, Mich.

[21] Appl. No.: 144,282

[22] Filed: Jan. 15, 1988

Related U.S. Application Data

[63] Continuation-in-part of Ser. No. 5,509, Jan. 20, 1987, abandoned.

[51] Int. Cl.$^4$ .................. B08B 3/04; B08B 17/00; C11D 1/835; C11D 3/43
[52] U.S. Cl. .................. 134/22.19; 134/23; 134/33; 134/42; 252/153; 252/170; 252/173; 252/174.21; 252/547; 252/548; 252/DIG. 14
[58] Field of Search .................. 252/153, 547, 174.21; 134/20, 23, 22.19, 33, 40

[56] References Cited

U.S. PATENT DOCUMENTS

| | | | |
|---|---|---|---|
| 2,509,197 | 5/1950 | Borus | 252/118 |
| 3,074,822 | 1/1963 | Walk et al. | 134/7 |
| 3,400,017 | 9/1968 | Huebner et al. | 134/7 |
| 3,491,027 | 1/1970 | Baker et al. | 252/86 |
| 3,779,213 | 3/1973 | Knudsen | 123/1 R |
| 3,830,660 | 8/1974 | Ezell | 134/23 |
| 3,879,216 | 4/1975 | Austin | 134/4 |
| 3,882,038 | 5/1975 | Clayton | 252/164 |
| 4,058,489 | 11/1977 | Hellsten | 252/547 |
| 4,059,123 | 11/1977 | Bartos et al. | 134/102 |
| 4,065,322 | 12/1977 | Langford | 134/7 |
| 4,196,020 | 4/1980 | Hornak | 134/167 R |
| 4,222,886 | 9/1980 | Connelly | 252/149 |
| 4,518,519 | 5/1985 | Lott | 252/148 |
| 4,540,505 | 9/1985 | Frazier | 252/106 |
| 4,713,120 | 12/1987 | Hodgens | 134/3 |

FOREIGN PATENT DOCUMENTS 1342077 12/1973 United Kingdom.

OTHER PUBLICATIONS

Braaten, "In-Service Cleaning of Power Units", The Indian & Eastern Engineer, vol. 124, #3, pp. 111-113 (1982).
Scheper, "Maintaining Gas Turbine Compressors for High Efficiency", Power Engineering, Aug. 1978, pp. 54-57.
Elser, "Experience Gained in Cleaning the Compressors of Rolls-Royce Turbine Engines", Brennst.-Warme-Kraft, vol. 25, Sep. 1973, pp. 347-348.
Ect. Inc. "R-MC Compressor Cleaning".
General Electric "Gas Turbine Compressor Cleaning", GEI-41042.

Primary Examiner—Paul Lieberman
Assistant Examiner—Kathleen Markowski
Attorney, Agent, or Firm—B. G. Colley

[57] ABSTRACT

Gas turbine compressors are cleaned during power generation (on line) by periodically injecting or spraying into the air inlet, a cleaning composition comprising 4-95 percent by weight of a glycol ether such as ethylene glycol butyl ether, or a mixture of glycol ethers such as propylene glycol methyl ether and dipropylene glycol methyl ether, 0.1 to 14 percent by weight of a nonionic surfactant, 0.01 to 6 percent by weight of a cationic surfactant and 0 to 95 percent by weight of water.

58 Claims, No Drawings

CLEANING GAS TURBINE COMPRESSORS

CROSS REFERENCE TO RELATED APPLICATION

This application is a continuation-in-part of copending application Ser. No. 5,509 filed Jan. 20, 1987 now abandoned.

BACKGROUND OF THE INVENTION

This invention relates to a composition of matter containing one or more glycol ethers in combination with detergents and a method of using the composition to clean gas turbine compressors during power generation or while running.

It is well known that the compressor section of gas turbine engines becomes dirty or fouled and must be cleaned periodically either by off-line cleaning or online cleaning methods. Examples may be found in the following: Scheper et al, "Maintaining Gas Turbine Compressors for High Efficiency," *Power Engineering*, August 1978, pp. 54–57 and Braaten, "In-service Cleaning of Power Units," *The Indian and Eastern Engineer*, Vol. 124, March 1982, pp. 111–113 and Elser, "Experience Gained in Cleaning the Compressors of Rolls-Royce Turbine Engines," Brennst-Warme-Kraft, Vol. 5, September 1973, pp. 347–348.

The Braaten and Scheper articles indicate that the fluid used for on-line cleaning can be a dispersion of surface active agents in water.

It is known that water washes only clean the first rows of the compressor blades. There is a need for a cleaning fluid with a higher boiling point that penetrates and cleans farther back in the rows of compressor blades. There is also a need for a cleaning fluid that has a relatively low freezing point so that it can be used and stored in areas subjected to extreme cold temperatures without precipitation of the components or the formation of ice crystals.

It is also known from Clayton et al., U.S. Pat. No. 3,882,038, that glycol ethers can be used with anionic, amphoteric, or nonionic surfactants in aqueous cleaner formulations However, the present invention is directed to a combination of a cationic and a nonionic surfactant with the glycol ethers and this specific combination is not suggested by the 3,882,038 patent.

SUMMARY OF THE INVENTION

It has now been found that gas turbine compressors such as used in jet engines and industrial gas turbines used for power generation, mechanical drives, and aeroderived units can be cleaned on-line or during power generation by using a mixture having the composition
(A) 4 to 95 percent by weight of one or more glycol ethers having the formula

where R is an alkyl group of 1 to 4 carbons, X and X' are each independently hydrogen, methyl or ethyl, with the provisos that X' is hydrogen when X is methyl or ethyl and that X is hydrogen when X' is methyl or ethyl and n is 1, 2, 3, 4, or 5,
(B) 0.1 to 14 percent by weight of ethylene oxide adducts of fatty acids, alkyl phenols or aliphatic alcohols each having an aliphatic group of 6 to 20 carbons and each having 4 to 15 ethylene oxide units,
(C) 0.01 to 6 percent by weight of a cationic surfactant, and
(D) 0 to 95 percent by weight water.

The concentrated cleaning composition of this invention is a formulation or mixture substantially free of water and having
(A) about 80 to about 95 percent by weight of one or more glycol ethers having the formula

where R is an alkyl group of 1 to 4 carbons, X and X' are each independently hydrogen, methyl, or ethyl with the provisos that X' is hydrogen when X is methyl or ethyl and that X is hydrogen when X' is methyl or ethyl and n is 1, 2, 3, 4, or 5,
(B) about 1 to about 14 percent by weight of ethylene oxide adducts of fatty acids, alkyl phenols or aliphatic alcohols each having an aliphatic group of 6 to 20 carbons and each having 4 to 15 ethylene oxide units, and
(C) about 0.1 to about 6 percent by weight of a cationic surfactant.

The above formulation covers a concentrated form of the composition which could be used with or without dilution with water. The concentrated form is useful for shipping purposes to remote destinations. The concentrate is normally diluted with deionized water and sprayed into the inlet of a compressor.

Another aspect of the invention is a method for cleaning a gas turbine compressor and/or the blades thereof comprising contacting the surfaces to be cleaned with the above composition during on-line operation of the compressor.

The invention is also directed towards a method of cleaning a gas turbine compressor and/or the blades thereof wherein the above formulation in concentrated form is diluted with purified, e.g. deionized, water so that the water content is in the range from about 5 to about 95 percent by weight. This dilute solution is then sprayed into the compressor periodically to reduce the deposits. Most preferably the concentrate is diluted to contain from about 60 to about 90 percent purified water by weight when ambient temperatures permit, so that the composition used for cleaning contains from about 0.5 to about 14 percent Component B, about 0.05 to about 6 percent Component C, and the balance at least 10% Component A. In some cases, it is desirable to flush the compressor with a deionized water spray before or after the use of the cleaning solution

DETAILED DESCRIPTION OF THE INVENTION

All references to percent of ingredients in compositions described herein are percent by weight of the total composition.

The water employed in this invention, whether as a component of the composition or in the water spray step optionally used before or after use of the composition, should be substantially free of components which are known to cause corrosion or erosion of compressor components. The term "purified water" is used herein to denote such water, which may be deionized water, distilled water or steam condensate, or the like.

The glycol ethers suitable for use in this invention are illustrated by ethylene glycol alkyl ethers, diethylene glycol alkyl ethers, triethylene glycol alkyl ethers, propylene glycol alkyl ethers, dipropylene glycol alkyl ethers, tripropylene glycol alkyl ethers and butylene glycol alkyl ethers as illustrated by ethylene glycol butyl ether, diethylene glycol methyl ether, diethylene glycol ethyl ether, diethylene glycol butyl ether, triethylene glycol butyl ether, triethylene glycol methyl ether, triethylene glycol ethyl ether, ethylene glycol propyl ether, diethylene glycol propyl ether, triethylene glycol propyl ether and mixtures thereof. Other glycol ethers suitable for use in this invention are propylene glycol butyl ether, propylene glycol ethyl ether, propylene glycol methyl ether, dipropylene glycol methyl ether, dipropylene glycol ethyl ether, dipropylene glycol butyl ether, tripropylene glycol butyl ether, tripropylene glycol propyl ether, tripropylene glycol methyl ether, butylene glycol methyl ether, butylene glycol ethyl ether, butylene glycol propyl ether, butylene glycol butyl ether, dibutylene glycol butyl ether, tributylene glycol butyl ether, tetraethylene glycol butyl ether, tetrapropylene glycol methyl ether pentaethylene glycol butyl ether, pentapropylene glycol methyl ether, and mixtures thereof. Preferred glycol ethers are those described by formula set forth above in which X is hydrogen and n is 1, 2, or 3.

Nonionic detergents useful in this invention are commercially available under various tradenames such as Surfonic N-100 from the Texaco Chemical Company and the like. In general, these are classified as alkyl phenol ethoxylates, alcohol ethoxylates, and fatty acid ethoxylates. Further information on these surfactants is found in the *Encyclopedia of Chemical Technology*, 3rd Edition, Vol. 22, pp. 332–432. This information is incorporated by reference herein.

Useful cationic surfactants are the adducts of ethylene oxide and mono-alkyl amines or monoalkyl 1,3-propanediamines. These are also commercially available under such tradenames as Ethomeen C/25 and Ethoduomeen T/25.

Other useful cationic surfactants are alkyl monoamines, alkyl trimethylenediamines, alkyl-2-imidazolines, 2-alkyl-1-(2-aminoethyl)-2-imidazolines, 2-alkyl-1-(2-hydroxyethyl)-2-imidazolines, ethylenediamine alkoxylates, and quaternary ammonium salts. These are also described and shown in the above *Encyclopedia of Chemical Technology*.

The dispering power of the detergents is known to be an important factor in keeping the turbine blades free of contaminant. It is known that both organic and inorganic air borne particles can develop and hold a charge or become polar. The charged or polar nature of these particles causes them to coagulate and/or stick to grounded or polar surfaces. In order to effectively remove these particles from turbine blades, it is necessary to (1) reduce the static charge that may build up on the blade surface, (2) prevent the particles from being attracted to one another through polar interactions, and (3) once removed from the blade's surface, prevent these particles from being redeposited by dispersing them in the detergent mixture. The key, therefore, to preparing an effective detergent, is to incorporate surfactants and/or solvents which will function to reduce or eliminate the polar particle/particle and particle/blade surface interactions which prevent effective blade cleaning.

The preferred concentration ranges for use in cleaning a gas turbine compressor on line are:
Component A, the glycol ether(s): about 10 to about 90 weight percent:
Component B, the nonionic surfactant(s): about 0.5 to about 14 weight percent;
Component C, the cationic surfactant(s): about 0.05 to about 6 weight percent: and
Component D, purified water: the balance, with the proviso that in the preferred embodiment the balance is at least about 5 weight percent.

With the benefit of the teachings contained herein, without undue experimentation persons skilled in the art will be able to optimize compositions within the scope of the present invention for use or storage in cold weather conditions so that the composition is substantially free of a solid phase. Surfactants may precipitate from formulations containing substantially no water as temperatures decrease. This phenomenon can be suppressed by adding an appropriate amount of purified water to the formulation freezing at low temperatures. The temperatures at which these phenomena occur vary depending on the relative proportions of the ingredients and the identity of the ingredients in the particular formulation. Additional information may be found in *The Glycol Ethers Handbook*, Form No. 110-363-985 published by The Dow Chemical Company-the teachings of which are incorporated herein.

If the composition is to be used at an ambient temperature below 5° C. or stored under conditions where it may be exposed to temperatures below 0° C., the preferred conoentration ranges are as follows:
Component A, the glycol ether(s): about 40 to about 90 weight percent
Component B, the nonionic surfactant(s): about 1 to about 7 weight percent:
Component C, the cationic surfactant(s): about 0.2 to about 6 weight percent; and
Component D, purified water: the balance, with the proviso that in this embodiment the balance being at least about 5 weight percent.

A composition consisting essentially of about 30.1% propylene glycol methyl ether, about 30.1% dipropylene glycol methyl ether, about 4.4% nonylphenol polyethylene glycol ether, about 0.4% polyoxyethyl cocoamine, and the balance (about 35%) purified water may be stored at ambient temperatures as low as −40° C. and used as low as −36° C. The minimum temperature for use is slightly higher to allow for the evaporative cooling effect around the inlet to the compressor section during power generation. Such a formulation can of course be diluted, e.g. optionally with about 4 parts by weight additional purified water per part of formulation, if ambient temperatures at the time of use are at or above about 5° C.

Various anionic, cationic, and nonionic surfactants were formulated into aqueous solutions (1) by themselves, (2) in combinations with one another, and (3) as mixtures with various organic solvents. Specific compounds tried which are generally referred to as anionic surfactants include: alkyl diphenyl oxide disulfonates such as DOWFAX (Trademark of The Dow Chemical Company) 2A0, 2A1, 3B0, and 3B2, and dodecyl sodium sulfate, and hexadecylaminediphosphonic acid, palmitic acid, lauric acid, and stearic acid. Specific compounds tried which are generally referred to as cationic surfactants include: polyethoxylated quaternary ammonium chlorides, and polyethoxylated fatty amines, and cocohydroxyethyl imidazoline. Specific compounds tried which are generally referred to as nonionic surfactants include: nonylphenoxy polyethoxy ethanols, and tridecylalcohol polyethoxylates.

These formulated mixtures were placed under a microscope with small amounts of "dirt" deposits and oily compounds typically found in compressor sections of industrial gas turbines. The relative abilities of these formulated mixtures to disperse the oil and dirt particles were then qualitatively compared. Most anionic surfactants, such as dodecyl sodium sulfate, in themselves did not separate the dirt particles as well as when employed as a mixture with either a cationic surfactant, such as Ethomeen C/25, or a nonionic surfactant, such as Surfonic N-0, or with combinations of both.

It has been found that the use of cationic surfactants alone or in combination with nonionic surfactants, when formulated with water and a glycol ether solvent, reduces or eliminates unfavorable particle interactions as evidenced by the ability of these formulations to disperse turbine blade contaminants in the detergent solution. Dispersion studies were conducted using the formulations described in the experimental procedure to demonstrate the unique ability of cationic surfactants to aid in turbine blade contaminant removal.

Experimental Procedure for Measuring Dispersing Power of Turbine Cleaning Agents Formulations 1–6 as set forth in Table I were prepared by placing the desired weight percent of ingredients into a 4 oz. jar and shaking the contents until thoroughly mixed. In a 1 dram vial was placed 5.00 mg of dirt removed from a used compressor, i.e. Turbine Blade Scraping (TBS). To this was added enough cleaning formulation to provide a mixture containing 0.113% TBS (4.413 g). After the preparation of all mixtures, the vials were placed in an ultrasonic bath for 22 minutes. The vials were then shaken vigorously and placed in a Perkin-Elmer Spectrophotometer (Model 35) Percent transmittance (550 nm) was then measured at 0.5 minute intervals for a total of five minutes. The data on transmittance is set forth in Table 11.

TABLE I

| Formulation | Surfonic N-100 Nonionic Surfactant (% by wt.) | Ethomeen C/25 Cationic Surfactant (% by wt.) | DOWANOL*EB Ethylene Glycol Butyl Ether (% by wt.) | $H_2O$** (% by wt.) |
|---|---|---|---|---|
| 1 | 1.0 | 0.1 | 13.9 | 85.0 |
| 2 | 1.0 | 0 | 13.9 | 85.1 |
| 3 | 0 | 0.1 | 13.9 | 86.0 |
| 4 | 1.0 | 1.0 | 13.9 | 84.1 |
| 5 | 1.0 | 0.1 | 0 | 98.9 |
| 6 | 0.1 | 0.5 | 13.9 | 85.5 |

*Trademark of the Dow Chemical Company
**deionized water

TABLE II

| Time (min.) | Transmittance (%) Form. 1 | Form. 2 | Form. 3 | Form. 4 | Form. 5 | Form. 6 |
|---|---|---|---|---|---|---|
| 0.5 | 15.5 | 3.1 | 1.0 | 7.6 | 29.9 | 0.2 |
| 1.0 | 17.3 | 3.2 | 1.0 | 8.1 | 33.1 | 0.2 |
| 1.5 | 18.3 | 3.4 | 1.1 | 8.6 | 35.1 | 0.2 |
| 2.0 | 19.0 | 3.5 | 1.1 | 8.9 | 37.1 | 0.2 |
| 2.5 | 19.6 | 3.5 | 1.1 | 9.2 | 38.1 | 0.2 |
| 3.0 | 19.9 | 3.6 | 1.1 | 9.4 | 39.4 | 0.2 |
| 3.5 | 20.1 | 3.6 | 1.2 | 9.6 | 40.0 | 0.2 |
| 4.0 | 20.5 | 3.7 | 1.2 | 9.8 | 40.6 | 0.2 |
| 4.5 | 20.7 | 3.7 | 1.2 | 10.0 | 40.9 | 0.2 |
| 5.0 | 21.0 | 3.8 | 1.2 | 10.1 | 41.2 | 0.2 |
| dT | 5.5 | 0.7 | 0.2 | 2.5 | 11.3 | 0 |
| Dt/dt[a] | 1.1 | 0.14 | 0.04 | 0.5 | 2.26 | 0 |
| SLOPE[b] | 1.07 | 0.14 | 0.05 | 0.53 | 2.35 | 0 |

[a](Highest % T − Lowest % T) divided by five.
[b]Slope determined by linear regression of computer plotted date.

The dispersion data in Table II is based on the following principle. As the concentration of particulate matter dispersed in the detergent formulation decreases, the mixture becomes less opaque and therefore allows more light to be transmitted through the dispersion (i.e. with increasing time, % T increases). The better a detergent is at reducing the polar or electrostatic particle/particle interactions, the more the particulates will be dispersed and the lower the percent transmittance reading. Furthermore, the most effective detergents will maintain a stable dispersion and the change in transmittance with time will be very small. From the data above, it can be seen that a combination of cationic and nonionic surfactants in water/glycol ether as in Formulation 6 provides the best dispersion initially (lowest % T at 0.5 minutes) and maintains the dispersion as evidenced by no increase in transmittance with time (dT=0). The second best, Formulation 3, consists of only cationic surfactant and water/glycol ether, followed by Formulation 2 which consists of only nonionic surfactant and water/-glycol ether. Thus, it can be seen from this data that a combination of nonionic and cationic surfactants provide the optimum cleaning system.

Control A

A 100 megawatt Westinghouse Model W501D5 gas turbine equipped with standard air filters was run for forty days after cleaning the compressor section by the crank-soak wash method (off-line wash) during a shutdown for routine maintenance. At the end of 40 days it was found that the gas turbine had lost 1.5% compressor efficiency due to deposition of contaminants (or fouling) in the compressor section and blades.

Control B

The same gas turbine used in Control A was again run for 40 days after a shutdown and off-line wash of the compressor section. During this run the gas turbine compressor was subjected to a spray of condensed steam by means of spray nozzles in the inlet of the compressor while the gas turbine was running under full load (on-line water wash). A flow rate of 8.5 gallons per minute (32.2 liters/min.) for 30 minutes (255 gallons (965 liters) per wash) was used once a day for eaoh of the 40 days. At the end of the last day, it was found that the compressor efficiency dropped 0.9% from the first day. This is a 40% improvement in performance with this on-line water wash.

Control C

The same gas turbine used in Control B was run for an additional 30 days without shutting down using the same amount of daily on-line water washing. After this 70 day period, it was found that the compressor efficiency dropped 1.7%.

EXAMPLE 1

The gas turbine used in Control B was run for 70 days with a 15 minutes per day wash of an aqueous solution containing 13.9% ethylene glycol butyl ether, 1.0% of a nonylphenol polyethylene glycol ether (Surfonic N-100), 0.1% of a polyoxyethyl coco-amine (Ethomeen C/25). The flow rate was 8.5 gallons per minute (32.2 liters/min).

After each on-line glycol ether wash, the gas turbine compressor was sprayed with steam condensate as a rinse for an equal amount of time at the same flow rate.

At the end of 70 days, there was only a 0.5% drop in compressor efficiency. This is a 70% improvement in performance over the use of the on-line water wash of Control C.

EXAMPLE 2

The procedure of Example 1 was repeated using as the wash liquid an aqueous solution containing 6.95% propylene glycol methyl ether, 6.95% dipropylene glycol methyl ether, 1.0% nonylphenol polyethylene glycol ether, 0.1% polyoxyethyl coco-amine, and the remainder being water. After each on-line glycol ether wash, the gas turbine compressor was sprayed with steam condensate (rinse) for an equal time and an equal amount. At the end of 70 days, there was a 0.65% drop in compressor efficiency. This is a 61% improvement in performance over the use of the on-line water wash in Control C.

EXAMPLE 3

Another test was conducted on a 75 MW General Electric Frame 7E gas turbine (similarly equipped with air filters as the gas turbine in Control A) to demonstrate use of an on-line glycol ether wash during operating periods when the ambient temperature falls below 5° C. The gas turbine had been run for 130 days without on-line washing since the last shutdown and off-line wash of the compressor section.

The compressor was then washed on-line with the ambient temperature at −10° C. using as the wash liquid an aqueous solution containing 32.4% propylene glycol methyl ether, 32.4% dipropylene glycol methyl ether, 4.7% nonylphenol polyethylene glycol ether, 0.5% polyoxyethyl coco-amine, and the balance water. A flow rate of 11.0 gallons (41.6 liters) per minute for 10 minutes (total of 110 gallons (416 liters)) was used per wash cycle. The step of rinsing the compressor with steam condensate as described in Example 2 was not done in this test.

The compressor performance improved from 92.0% efficiency before the on-line glycol ether wash to 92.7% efficiency after the wash. A total of ten online glycol ether wash cycles were used over the following 30 days during which time the ambient temperatures ranged from −10° C. to 16° C. The average compressor performance improvement was found to be 0.2% efficiency per wash cycle.

There were no signs of any freezing or solids precipitation occurring with the wash solution, nor ice forming during the on-line glycol ether wash cycles.

We claim:

1. A composition suitable for cleaning a gas turbine compressor on-line, consisting essentially of a mixture of:

(A) 4 to 95 percent by weight one or more glycol ethers having the formula

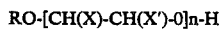

RO-[CH(X)-CH(X')-O]n-H where R is an alkyl group of 1 to 4 carbons, X and X' are each independently hydrogen, methyl, or ethyl, with the provisos that X' is hydrogen when X is methyl or ethyl and that X is hydrogen when X' is methyl or ethyl and n is 1, 2, 3, 4, or 5:

(B) 0.1 to 14 percent by weight ethylene oxide adducts of fatty acids, alkyl phenols or aliphatic alcohols each having an aliphatic group of 6 to 20 carbons and each having 4 to 15 ethylene oxide units:

(C) 0.01 to 6 percent by weight a cationic surfactant; and (D) 0 to 95 percent by weight purified water.

2. The composition of claim 1 wherein the respective components are present in the following amounts, namely, Component A, from about 80 to about 95 weight percent, Component B, from about 1 to about 14 weight percent, and Component C, from about 0.1 to about 6 weight percent, and the composition is substantially free of water.

3. The composition of claim 1 wherein the respective components are present in the following amounts, namely, Component A, from about 10 to about 90 weight percent, Component B, from about 0.5 to about 14 weight percent, Component C, from about 0.05 to about 6 weight percent, and Component D, the balance, with the proviso that the balance is at least about 5 weight percent.

4. The composition of claim 3 wherein the respective components are present in the following amounts, namely, Component A, from about 40 to about 90 weight percent, Component B, from about 1 to about 7 weight percent, Component C, from about 0.2 to about 6 weight percent, and Component D, the balance, with the proviso that the balance is at least about 5 weight percent, so that the composition is substantially free of a solid phase at ambient temperatures at below 5° C. to which the composition may be exposed during storage or use.

5. The composition of claim 1 wherein Component B is a nonylphenol polyethylene glycol ether.

6. The composition of claim 1 wherein Component C comprises ethylene oxide adducts of monoalkylamines and monoalkyl 1,3-propanediamines having an alkyl group with 10 to 20 carbon atoms with each amine adduct having 2 to 20 ethylene oxide units.

7. The composition of claim 6 wherein Component C comprises polyoxyethyl coco-amine.

8. The composition of claim 1 wherein X is hydrogen and n is 1, 2, or 3.

9. The composition of claim 8 wherein X' is hydrogen or methyl.

10. The composition of claim 1 wherein Component A is one or more glycol ethers selected from the group consisting of ethylene glycol alkyl ethers, diethylene glycol alkyl ethers, triethylene glycol alkyl ethers, propylene glycol alkyl ethers, dipropylene glycol alkyl ethers, tripropylene glycol alkyl ethers, butylene glycol alkyl ethers, dibutylene glycol alkyl ethers, tributylene glycol alkyl ethers, and mixtures thereof.

11. The composition of claim 10 wherein the respective components are present in the following amounts, namely, Component A, from about 80 to about 95 weight percent,
Component B, from about 1 to about 14 weight percent, and
Component C, from about 0.1 to about 6 weight percent, and the composition is substantially free of water.

12. The composition of claim 10 wherein the respective components are present in the following amounts, namely, Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

13. The composition of claim 12 wherein the respective components are present in the following amounts, namely, Component A, from about 40 to about 90 weight percent,
Component B, from about 1 to about 7 weight percent,
Component C, from about 0.2 to about 6 weight percent, and
Component D, the balance, with the proviso that the balance is at least about 5 weight percent,
so that the composition is substantially free of a solid phase at ambient temperatures at below 5° C. to which the composition may be exposed during storage or use.

14. The composition of claim 10 wherein Component C comprises ethylene oxide adducts of monoalkylamines and monoalkyl 1,3-propanediamines having an alkyl group with 10 to 20 carbon atoms with each amine adduct having 2 to 20 ethylene oxide units.

15. The composition of claim 14 wherein the respective components are present in the following amounts, namely, Component A, from about 80 to about 95 weight percent,
Component B, from about 1 to about 14 weight percent, and
Component C, from about 0.1 to about 6 weight percent, and the composition is substantially free of water.

16. The composition of claim 14 wherein the respective components are present in the following amounts, namely, Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

17. The oomposition of claim 16 wherein the respective components are present in the following amounts, namely, Component A, from about 40 to about 90 weight percent,
Component B, from about 1 to about 7 weight percent,
Component C, from about 0.2 to about 6 weight percent, and
Component D, the balance, with the proviso that the balance is at least about 5 weight percent,
so that the composition is substantially free of a solid phase at ambient temperatures at below 5° C. to which the composition may be exposed during storage or use.

18. The composition of claim 10 wherein Component A comprises at least one of ethylene glycol butyl ether and propylene glycol methyl ether, and dipropylene glycol methyl ether.

19. The composition of claim 18 wherein the respective components are present in the following amounts, namely, Component A, from about 80 to about 95 weight percent,
Component B, from about 1 to about 14 weight percent, and
Component C, from about 0.1 to about 6 weight percent, and the composition is substantially free of water.

20. The composition of claim 18 wherein the respective components are present in the following amounts, namely, Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

21. The composition of claim 18 wherein the respective components are present in the following amounts, namely, Component A, from about 40 to about 90 weight percent,
Component B, from about 1 to about 7 weight percent,
Component C, from about 0.2 to about 6 weight percent, and
Component D, the balance, with the proviso that the balance is at least about 5 weight percent,
so that the composition is substantially free of a solid phase at ambient temperatures at below 5° C. to which the composition may be exposed during storage or use.

22. The composition of claim 18 wherein Component C comprises ethylene oxide adducts of monoalkylamines and monoalkyl 1,3-propanediamines having an alkyl group with 10 to 20 carbon atoms with each amine adduct having 2 to 20 ethylene oxide units.

23. The composition of claim 22 wherein Component B is nonylphenol polyethylene glycol ether and Component C is polyoxyethyl coco-amine.

24. The composition of claim 10 wherein Component A is a mixture of propylene glycol methyl ether and dipropylene glycol methyl ether.

25. The composition of claim 24 wherein the respective components are present in the following amounts, namely, Component A, from about 80 to about 95 weight percent,
Component B, from about 1 to about 14 weight percent, and
Component C, from about 0.1 to about 6 weight percent, and the composition is substantially free of water.

26. The composition of claim 24 wherein the respective components are present in the following amounts, namely,
Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

27. The composition of claim 26 wherein the respective components are present in the following amounts, namely,
Component A, from about 40 to about 90 weight percent,
Component B, from about 1 to about 7 weight percent,
Component C, from about 0.2 to about 6 weight percent, and
Component D, the balance, with the proviso that the balance is at least about 5 weight percent,
so that the composition is substantially free of a solid phase at ambient temperatures at below 5° C. to which the composition may be exposed during storage or use.

28. The composition of claim 24 wherein Component C comprises ethylene oxide adducts of monoalkylamines and monoalkyl 1,3-propanediamines having an alkyl group with 10 to 20 carbon atoms with each amine adduct having 2 to 20 ethylene oxide units.

29. The composition of claim 28 wherein the respective components are present in the following amounts, namely,
Component A, from about 80 to about 95 weight percent,
Component B, from about 1 to about 14 weight percent, and
Component C, from about 0.1 to about 6 weight percent,
and the composition is substantially free of water.

30. The composition of claim 28 wherein the respective components are present in the following amounts, namely,
Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

31. The composition of claim 30 wherein the respective components are present in the following amounts, namely,
Component A, from about 40 to about 90 weight percent,
Component B, from about 1 to about 7 weight percent,
Component C, from about 0.2 to about 6 weight percent, and
Component D, the balance, with the proviso that the balance is at least about 5 weight percent,
so that the composition is substantially free of a solid phase at ambient temperatures at below 5° C. to which the composition may be exposed during storage or use.

32. The composition of claim 28 wherein Component B is nonyl phenol polyethylene glycol ether and Component C is polyoxyethyl coco-amine.

33. The composition of claim 32 which consists essentially of the respective components in the following amounts, namely,
Component A, from about 10 to about 90 weight percent,
Component B, from about 0.5 to about 14 weight percent,
Component C, from about 0.05 to about 6 weight percent, and
Component D, the balance, with the proviso that the balance is at least about 5 weight percent.

34. The composition of claim 32 which consists essentially of, by weight, about 30.1 percent propylene glycol methyl ether, about 30.1 percent dipropylene glycol methyl ether, about 4.4 percent nonylphenol polyethylene glycol ether, about 0.4 percent polyoxyethyl coco-amine, and the balance purified water.

35. A method of cleaning a gas turbine compressor and/or the blades thereof during power generation without significant loss of power, which comprises contacting the surfaces to be cleaned with a cleaning composition consisting essentially of a mixture of:
(A) 4 to 95 percent by weight one or more glycol ethers having the formula

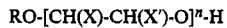
RO-[CH(X)-CH(X')-O]$^n$-H where R is an alkyl group of 1 to 4 carbons, X and X' are each independently hydrogen, methyl, or ethyl, with the provisos that X' is hydrogen when X is methyl or ethyl and that X is hydrogen when X' is methyl or ethyl and n is 1, 2, 3, 4, or 5;
(B) 0.1 to 14 percent by weight ethylene oxide adducts of fatty acids, alkyl phenols or aliphatic alcohols each having an aliphatic group of 6 to 20 carbons and each having 4 to 15 ethylene oxide units;
(C) 0.01 to 6 percent by weight a cationic surfactant; and
(D) 0 to 95 percent by weight purified water,
in an amount effective to reduce deposits on the compressor or the blades thereof.

36. The method of claim 35 wherein the contacting step comprises periodically spraying the composition into the inlet of the compressor at a rate sufficient to reduce deposits on the compressor or the blades thereof.

37. The method of claim 36 which includes an additional step of periodically spraying purified water into the inlet of the compressor at a rate sufficient to further reduce deposits.

38. The method of claim 35 which includes the steps of providing a concentrated composition consisting essentially of a mixture of
(A) one or more glycol ethers having the formula

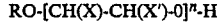
RO-[CH(X)-CH(X')-O]$^n$-H where R is an alkyl group of 1 to 4 carbons, X and X' are each independently hydrogen, methyl, or ethyl, with the provisos that X' is hydrogen when X is methyl or ethyl and that X is hydrogen when X' is methyl or ethyl and n is 1, 2, 3, 4, or 5,
(B) ethylene oxide adducts of fatty acids, alkyl phenols or aliphatic alcohols each having an aliphatic group of 6 to 20 carbons and each having 4 to 15 ethylene oxide units, and (C) a cationic surfactant, and diluting the mixture with purified water to obtain the cleaning composition, the proportions of Components A, B, and C in the concentrated composition being such that upon dilution, the cleaning composition contains from 4 to 95 percent Component A, from 0.1 to 14 percent Component B, from 0.01 to 6 percent Component C, and from 5 to 95 percent purified water.

39. The method of claim 35 wherein the respective components in the cleaning composition are present in the following amounts, namely, Component A, from about 10 to about 90 weight percent, Component B, from about 0.5 to about 14 weight percent, Component C, from about 0.05 to about 6 weight percent, and Component D, the balance, with the proviso that the balance is at least about 5 weight percent.

40. The method of claim 39 wherein the respective components in the cleaning composition are present in the following amounts, namely, Component A, from about 40 to about 90 weight percent, Component B, from about 1 to about 7 weight percent, Component C, from about 0.2 to about 6 weight percent, and Component D, the balance, with the proviso that the balance is at least about 5 weight percent, so that the composition is substantially free of a solid phase at ambient temperatures at below 5° C. to which the composition may be exposed during storage or use.

41. The method of claim 40 wherein the method is carried out at an ambient temperature below 5° C.

42. The method of claim 40 wherein the contacting step comprises periodically spraying the cleaning composition into the inlet of the compressor at a rate sufficient to reduce deposits on the compressor or the blades thereof.

43. The method of claim 42 wherein the method is carried out at an ambient temperature below 5° C.

44. The method of claim 39 wherein the contacting step comprises periodically spraying the cleaning composition into the inlet of the compressor at a rate sufficient to reduce deposits on the compressor or the blades thereof.

45. The method of claim 44 which includes an additional step of periodically spraying purified water into the inlet of the compressor at a rate sufficient to further reduce deposits.

46. The method of claim 44 wherein

Component A comprises one or more glycol ethers selected from the group consisting of ethylene glycol alkyl ethers, diethylene glycol alkyl ethers, triethylene glycol alkyl ethers, propylene glycol alkyl ethers, dipropylene glycol alkyl ethers, tripropylene glycol alkyl ethers, butylene glycol alkyl ethers, dibutylene glycol alkyl ethers, tributylene glycol alkyl ethers, and mixtures thereof, and Component C comprises ethylene oxide adducts of monoalkylamines and monoalkyl 1,3-propanediamines having an alkyl group with 10 to 20 carbon atoms with each amine adduct having 2 to 20 ethylene oxide units.

47. The method of claim 46 wherein Component B is a nonylphenol polyethylene glycol ether.

48. The method of claim 47 which includes the steps of providing a concentrated composition consisting essentially of a mixture of (A) one or more glycol ethers selected from the group consisting of ethylene glycol alkyl ethers, diethylene glycol alkyl ethers, triethylene glycol alkyl ethers, propylene glycol alkyl ethers, dipropylene glycol alkyl ethers, tripropylene glycol alkyl ethers, butylene glycol alkyl ethers, dibutylene glycol alkyl ethers, tributylene glycol alkyl ethers, and mixtures thereof, (B) a nonylphenol polyethylene glycol ether, and (C) ethylene oxide adducts of monoalkylamines and monoalkyl 1,3-propanediamines having an alkyl group with 10 to 20 carbon atoms with each amine adduct having 2 to 20 ethylene oxide units, and diluting the mixture with purified water to obtain the cleaning composition, the proportions of Components A, B, and C in the concentrated composition being such that upon dilution, the cleaning composition contains from about 0.5 to about 14 percent Component B, from about 0.05 to about 6 percent Component C, from 60 to 90 percent purified water, and the balance, at least about 10 percent Component A.

49. The method of claim 48 which includes an additional step of periodically spraying purified water into the inlet of the compressor at a rate sufficient to further reduce deposits.

50. The method of claim 47 wherein the respective components in the cleaning composition are present in the following amounts, namely, Component A, from about 40 to about 90 weight percent, Component B, from about 1 to about 7 weight percent, Component C, from about 0.2 to about 6 weight percent, and Component D, the balance, with the proviso that the balance is at least about 5 weight percent, so that the composition is substantially free of a solid phase at ambient temperatures at below 5° C. to which the composition may be exposed during storage or use.

51. The method of claim 50 wherein Component A is a mixture of propylene glycol methyl ether and dipropylene glycol methyl ether and Component C is polyoxyethyl coco-amine.

52. The method of claim 51 wherein the method is carried out at an ambient temperature below 5° C.

53. The method of claim 51 wherein the cleaning composition consisting essentially of, by weight, about 30.1 percent propylene glycol methyl ether, about 30.1 percent dipropylene glycol methyl ether, about 4.4 percent nonylphenol polyethylene glycol ether, about 0.4 percent polyoxyethyl coco-amine, and the balance purified water.

54. The method of claim 53 wherein the method is carried out at least in part at an ambient temperature of from about 5° C. to about −36° C.

55. The method of claim 53 wherein the method includes a step of exposing the cleaning composition to a cold ambient temperature whereby the temperature of the composition is within the range of from about 5° C. to about −36° C. at least once prior to spraying the composition into the compressor.

56. The method of claim 47 wherein Component A is a mixture of propylene glycol methyl ether and dipropylene glycol methyl ether and Component C is polyoxyethyl coco-amine.

57. The method of claim 56 which includes the steps of providing a concentrated composition consisting essentially of a mixture of
(A) a mixture of propylene glycol methyl ether and dipropylene glycol methyl ether,
(B) a nonylphenol polyethylene glycol ether, and
(C) polyoxyethyl coco-amine,
and diluting the mxture with purified water to obtain the cleaning composition, the proportions of Components A, B, and C in the concentrated composition being such that upon dilution, the cleaning composition consists essentially of from about 0.5 to about 14 percent Component B, from about 0.05 to about 6 percent Component C, from about 60 to about 90 percent purified water, and the balance at least 10 percent Component A.

58. The method of claim 57 which includes an additional step of periodically spraying purified water into the inlet of the compressor at a rate sufficient to further reduce deposits.

* * * * *